US011221205B2

United States Patent
Li et al.

(10) Patent No.: US 11,221,205 B2
(45) Date of Patent: Jan. 11, 2022

(54) ITERATIVE OPTICAL DIFFRACTION TOMOGRAPHY (IODT) METHOD AND APPLICATIONS

(71) Applicant: UNIVERSITY OF CENTRAL FLORIDA RESEARCH FOUNDATION, INC., Orlando, FL (US)

(72) Inventors: Guifang Li, Orlando, FL (US); Shengli Fan, Orlando, FL (US); Seth Smith-Dryden, Orlando, FL (US); Bahaa Saleh, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 16/884,961

(22) Filed: May 27, 2020

(65) Prior Publication Data
US 2020/0378745 A1    Dec. 3, 2020

Related U.S. Application Data

(60) Provisional application No. 62/853,272, filed on May 28, 2019.

(51) Int. Cl.
*G01B 9/02*    (2006.01)
(52) U.S. Cl.
CPC ....... *G01B 9/02091* (2013.01); *G01B 9/0203* (2013.01); *G01B 9/02007* (2013.01)

(58) Field of Classification Search
CPC ............ G01B 9/02091; G01B 9/0209; G01B 9/02007; G01B 9/0203; G01B 9/02083; G01N 21/45; G01N 21/453; G06T 11/006
See application file for complete search history.

(56) References Cited

U.S. PATENT DOCUMENTS

2013/0280752 A1*   10/2013   Ozcan ............... G01B 9/02047
                                                              435/29

OTHER PUBLICATIONS

Lim, J., Ayoub, A.B., Antoine, E.E. et al. High-fidelity optical diffraction tomography of multiple scattering samples. Light Sci Appl 8, 82 (Year: 2019).*

* cited by examiner

*Primary Examiner* — Tarifur R Chowdhury
*Assistant Examiner* — Jonathon Cook
(74) *Attorney, Agent, or Firm* — Klintworth & Rozenblat IP LLP; William Greener

(57) ABSTRACT

A non-destructive iterative interferometric tomographic technique for imaging and reconstruction of phase objects as well as objects with complex permittivity and, particularly, to iterative optical diffraction tomographic (iODT) imaging and reconstruction of phase objects with high refractive index (RI) contrast, complex structures, and/or large optical path differences (OPDs) against the background, which cause multiple scattering, and applications thereof.

7 Claims, 9 Drawing Sheets (a) Propagation (b) Inversion

Perturbative complex phase Filtering Summation

ITERATIVE OPTICAL DIFFRACTION TOMOGRAPHY (iODT) METHOD AND APPLICATIONS

RELATED APPLICATION DATA

The instant application claims priority to U.S. provisional application Ser. No. 62/853,272 filed May 28, 2019, the subject matter of which is incorporated herein in its entirety.

GOVERNMENT FUNDING

Funding was provided under grant #1509294 from the National Science Foundation. The U.S. government has certain rights in the invention.

BACKGROUND

Aspects and embodiments generally are in the field of optical imaging. More particularly, aspects and embodiments are directed to optical diffraction tomographic (ODT) imaging and reconstruction of phase objects as well as objects with complex permittivity and, most particularly to iterative optical diffraction tomographic (iODT) imaging and reconstruction of phase objects with high refractive index (RI) contrast, complex structures, and/or large optical path differences (OPDs) against the background, which cause multiple scattering, and applications thereof.

As a label-free, non-destructive and quantitative imaging technique, optical diffraction tomography (ODT) has been widely used to reconstruct the refractive-index (RI) distribution of phase objects such as biological cells and tissues and optical fibers. ODT reconstructs the RI distributions of transparent samples by interferometrically measuring diffracted fields over multiple illumination angles and solving the inverse scattering problem, typically by adopting the weakly-scattering approximation known in the art. When such an assumption does not hold, e.g., when the object has a high contrast, complicated structure, or large optical path difference (OPD), conventional ODT inversion becomes ineffective. To extend the application of ODT reconstruction to the multiply-scattering regime, optimization algorithms based on the beam propagation method or the Lippmann-Schwinger equation were developed; however, such techniques can be time-consuming or trapped in a local minimum, especially for objects with large OPDs.

Quantitative refractive-index profiling is highly desired in the design and manufacturing of optical fibers and fiber devices. While topographic techniques require cleaving at the plane of measurement and careful etching and calibration, optical tomographic methods are non-destructive and do not required sample cleaving. If diffraction effects are negligible, as in the short-wavelength case, imaging of optical fibers can be assumed to follow a ray-optics model and reconstruction methods based on computed tomography (CT, such as optical phase tomography, can readily be used. However, when the wavelength of illumination is on a scale similar to the sample feature size, the wave nature of light must be accounted for. Optical diffraction tomography (ODT) was developed for this purpose. So far, ODT has been used for imaging a large-mode-area photonic-crystal fiber in the visible and near-infrared regimes and also for applications in label-free biological imaging with sub-wavelength resolution.

In ODT, the object to be imaged is transversely illuminated at each angle, and the diffracted field is measured. Under the weak-scattering condition, the diffracted fields are linearly related to the refractive index (RI) distribution of the object, through the use of the first-Born or Rytov approximation. Unfortunately, these linear inversion algorithms fail when the weak-scattering condition is not satisfied, as is the case for samples with high RI contrast, complex structures, and/or large optical path differences (OPDs) against the background, which cause multiple scattering. In these scenarios, the inversion problem becomes very challenging.

The inventors have recognized the benefits and advantages of an imaging/reconstruction method beyond the weak scattering regime. It would be particularly advantageous to develop an approach to robustly and accurately reconstruct multiply scattering two-dimensional and three-dimensional phase objects exhibiting high RI contrast, complex structures, and/or large optical path differences (OPDs) against the background. The disclosed aspects and embodiments enable such an approach.

SUMMARY

An exemplary, non-limiting embodiment is directed to an iterative Optical Diffraction Tomography (iODT) method resulting in improved object reconstruction quality by iteratively reducing the error between the fields that are diffracted by the reconstructed object, and the true fields that are measured experimentally or obtained through simulations of phantoms, for all illumination angles.

An exemplary, non-limiting embodiment is a method for performing iterative Optical Diffraction Tomography (iODT) for the reconstruction of an object, comprising the ordered steps of: a) selecting initial parameter values $\theta$: illumination angle, $u_0$: known incident wave, $u_t$: true diffracted field measured experimentally or through simulations of phantoms, $f^{(0)}$: initial estimate of an object function representing a true object $f(x,y)$, and m: iteration number beginning with m=0; b) selecting a constraint operator, C, and a propagation solver, S; c) applying the constraint operator, C, to the current estimated object function, as $Cf^{(m)}$; d) applying the propagation solver, S, to the known incident wave, $u_0$, through $Cf^{(m)}$ for each illumination angle, $\theta$, to generate a forward propagating field, $u^{(m)}_{fwd}(\theta)$; e) applying an inverse of the propagation solver, $S^{-1}$, to the true diffracted field, $u_t$, through $Cf^{(m)}$ for each illumination angle, $\theta$, to generate a backward propagating field, $u^{(m)}_{bwd}(\theta)$; f) computing the perturbative Rytov phase $\Delta\varphi^{(m)}_R(\theta)$ as $\ln[u^{(m)}_{fwd}(\theta)/u^{(m)}_{bwd}(\theta)]$; g) computing a correction, $\Delta f^{(m)}$, to the current estimate of the object function using the perturbative Rytov phase; h) updating the estimate of the object function to $f^{(m)} - \Delta f^{(m)}$ i) increasing the iteration number from m to m+1; and j) repeating steps (c-i) until a selected stop condition is met or a predetermined maximum number of iterations is reached. In various non-limiting aspects, the method may include one or more of the following steps, features, characteristics, or attributes alone or in combination as a person skilled in the art would understand.

wherein the constraint operator, C, is unity (i.e., a non-constraint), non-negativity, non-positivity, or reality (i.e., non-imaginary);

wherein the propagation solver, S, is the wide-angle beam propagation method (WABPM), or finite difference time domain (FDTD);

wherein computing the correction $\Delta f^{(m)}$ involves the following steps:
  a) obtaining a $\Pi$-image in the Fourier domain, $\Delta\Pi^{(m)}(\theta)$, by applying a filter to the Fourier transform of the perturbative Rytov phase $\Delta\varphi^{(m)}_R(\theta)$;

b) obtaining the correction, $\Delta f^{(m)}$ by summing the inverse Fourier transform of the Π-images over all illumination angles, θ wherein the filter is a ramp filter or a Shepp-Logan-Gaussian filter;

wherein the object is two dimensional or three dimensional;

wherein the known incident wave, $u_0$, is a plane wave.

An exemplary, non-limiting embodiment is an algorithm for performing iterative Optical Diffraction Tomography (iODT) for the reconstruction of an object, comprising the ordered steps 1-13 shown immediately below:

| Algorithm 1. iODT |
| --- |
| 1: input: $u_0$, $u_t$, $f^{(0)}$, $m_{max}$ |
| 2: set: m = 0, θ, $\mathcal{C}$, $\mathcal{S}$ |
| 3: repeat |
| 4:      $f^{(m)}(x,y) \leftarrow \mathcal{C} f^{(m)}(x,y)$      Constraint |
| 5:      $u_{fwd}^{(m)}(\xi,\eta,\theta) \leftarrow \mathcal{S}[u_0, f^{(m)}(x,y),\theta]$      Propagation |
| 6:      $u_{bwd}^{(m)}(\xi,\eta,\theta) \leftarrow \mathcal{S}^{-1}[u_t, f^{(m)}(x,y),\theta]$ |
| 7:      $\Delta\varphi_R^{(m)}(\xi,\eta,\theta) \leftarrow \ln[u_{fwd}^{(m)}(\xi,\eta,\theta)/u_{bwd}^{(m)}(\xi,\eta,\theta)]$      Inversion |
| 8:      $\Delta\Pi^{(m)}(\xi,\eta,\theta) \leftarrow \Delta\varphi_R^{(m)}(\xi,k_\eta,\theta) \cdot |k_\eta|$ |
| 9:      $f^{(m)}(x,y) \leftarrow -j2\pi k_b \int_0^{2\pi} \Delta\Pi^{(m)}(\xi,\eta,\theta)d\theta$ |
| 10:      $f^{(m)}(x,y) \leftarrow f^{(m)}(x,y) - \Delta f^{(m)}(x,y)$      Update |
| 11:      m ← m + 1 |
| 12: until stopping condition |
| 13: return: $f^{(m)}$ |

DETAILED DESCRIPTION OF EXEMPLARY, NON-LIMITING ASPECTS AND EMBODIMENTS OF THE INVENTION

A reconstruction algorithm aims at the inversion of a forward model relating the diffracted field to the object RI distribution. Reasonable assumptions are usually adopted to render the inversion feasible and efficient.

We first discuss the standard ODT inversion that is based on the Born or Rytov approximation, which linearizes the relation between the diffracted field and the object function. We then introduce the enabling framework of iODT, which is based on iterative perturbation for which the relation between the perturbative diffracted fields and the perturbative object function is linearized in each iteration, though ultimately the reconstructed object is nonlinearly related to measured diffracted fields.

Figure 1:
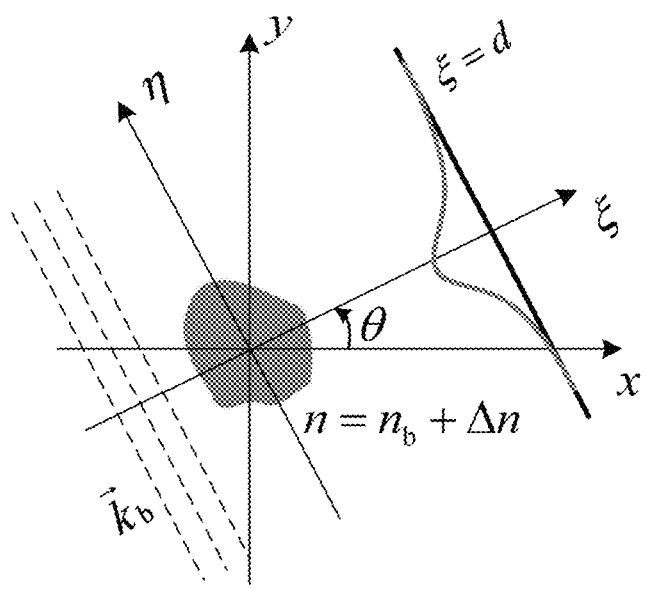
FIG. 1 schematically illustrates a tomographic imaging configuration.

The tomographic imaging configuration is shown in FIG. 1. For simplicity, two-dimensional (2D) phase objects are the objects/object fields discussed herein; but those skilled in the art will appreciate that extending the analysis to three dimensional objects is straightforward. The phase object to be reconstructed (e.g., an optical fiber cross-section) has a RI profile $n(x,y) = n_b + \Delta n(x,y)$, where $n_b$ is the RI of the background. The contrast of the object is defined by the ratio max$|\Delta n(x,y)|/n_b$. The object is illuminated by a set of plane waves with propagation constant $\kappa_b$ directed at different angles and the diffracted field is measured at each angle to form a sinogram. For illumination at an angle θ, the incident and diffracted fields $u_0(\xi,\eta)$ and $u(\xi,\eta,\theta)$ are expressed in the rotated "local" coordinates $(\xi,\eta)$, which are related to the fixed "global" coordinates $(x,y)$ by the relations: $x = \xi\cos\theta - \eta\sin\theta$ and $y = \xi\sin\theta + \eta\cos\theta$. Both ODT and iODT rely on Fourier transform operations. Throughout this specification, we use the same symbol to designate a function and its Fourier transform; for example, $\psi(k\eta,\theta)$ is the one-dimensional (1D) Fourier transform of $\psi(\eta,\theta)$ with respect to $\eta$.

Optical Diffraction Tomography

Conventional computed tomography (CT) is applicable to low-contrast phase objects with feature sizes much greater than the wavelength of the probe light so that diffraction is negligible. With a ray-optics forward model, measurement at each angle produces a projection of the object function, which can be used to obtain a slice of the Fourier transform of the object function in accordance with the projection-slice theorem. The measurements constitute a Radon transform, which may be inverted by means of filtered back-projection (FBPJ).

When the feature size of a low-contrast phase object is comparable with the wavelength, the effects of diffraction cannot be ignored. Under the condition of weak scattering, the Born or Rytov approximation is used to linearly relate the measured fields to the object function $f(x, y) = (2\pi k_0)^2 [n^2(x, y) - n_b^2]$. ODT reconstruction relies on the diffraction-slice theorem whose inversion is commonly performed by filtered back-propagation (FBPP). Here, we adopt the Rytov approximation, which has been shown to be typically superior to the Born approximation.

When reconstructing an off-axis object, the defocused optical field may fluctuate rapidly and the validity of the Rytov approximation then breaks down. A modified FBPP algorithm, called the extended-depth-of-focus (EDOF) FBPP, offers considerable improvements in the reconstruction of features at locations offset from the center of rotation. The Rytov-based EDOF-FBPP algorithm involves the following steps:

i) The measured field is back-propagated through the background medium to obtain the field $u(\xi, \eta, \theta)$ from which the Rytov complex phase is computed $$\phi_R(\xi,\eta,\theta) = \ln[u(\xi,\eta,\theta)/u_0(\xi,\eta)]. \quad (1)$$

ii) The complex phase is unwrapped and filtered in the spectral domain, $$\Pi_{EDOF}(\xi,k_\eta,\theta) = \phi_R(\xi,k_\eta,\theta)|k_\eta|. \quad (2)$$

iii) The inverse Fourier transform of $\Pi_{EDOF}(\xi, k_\eta, \theta)$ is summed over all illumination angles to reconstruct the object function $$f(x,y) = -j2\pi k_b \int_0^{2\pi} \Pi_{EDOF}(\xi,\eta,\theta)d\theta. \quad (3)$$

Iterative Optical Diffraction Tomography

Figure 2A:
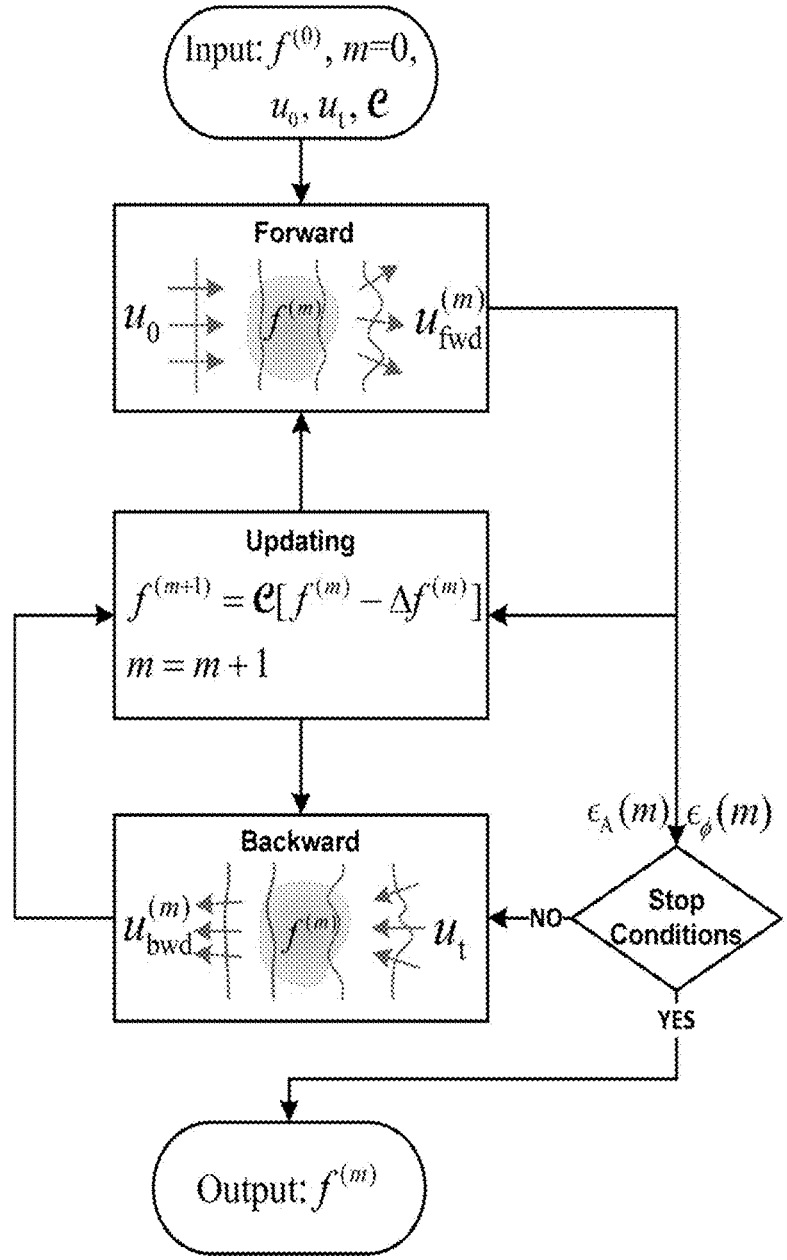
FIG. 2a is a block diagram of the iODT algorithm according to a non-limiting embodiment of the invention.
Figure 2B:
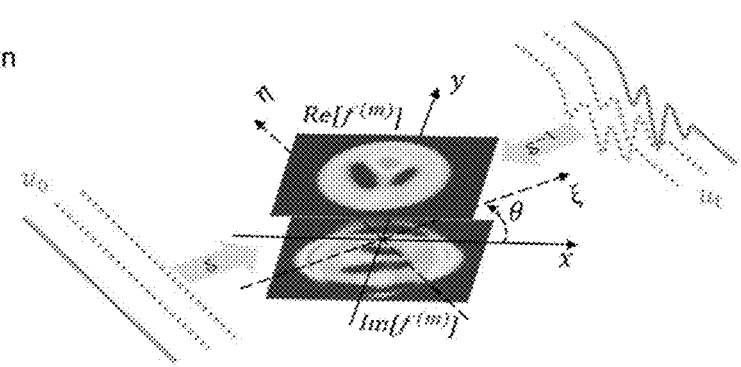
FIG. 2b is a schematic illustration of iODT according to a non-limiting embodiment of the invention.
Figure 2B:
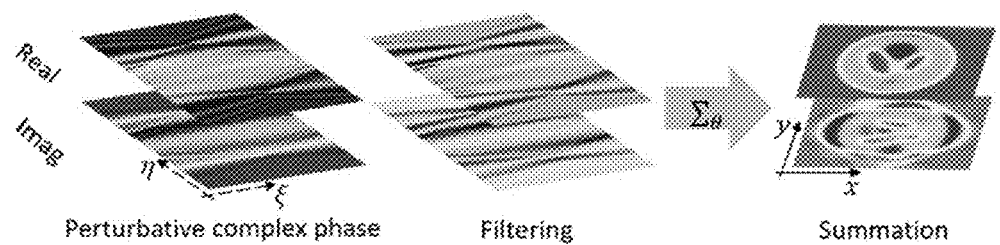

For phase objects having high RI contrast, complex structures, and/or large OPDs against the background, multiple scattering occurs and introduces nonlinearities between the measured field and the object function, which will render the linear reconstruction methods (including CT and ODT) ineffective. To reduce the reconstruction errors caused by multiple scattering, we disclose an iODT algorithm, schematically shown in FIGS. 2a and 2b. In FIG. 2a, $f^{(0)}$ represents an initial guess of the object function; m is the iteration number; $f^{(m)}$ represents the reconstructed object function in the $m^{th}$ iteration; $u_0$ is the known incident wave (plane wave); $u_t$ is the true field, which is obtained experimentally or through simulations of phantoms; C is a constraint operator; $u^{(m)}_{fwd}$ is the 2D forward-propagated incident field through the reconstructed object $f^{(m)}$; $u^{(m)}_{bwd}$ is the 2D backward propagated true field through the reconstructed object $f^{(m)}$; $\varepsilon_A(m)$, $\varepsilon_\phi(m)$ are the normalized root-mean-square errors in the amplitude and phase of the sinograms in the $m^{th}$ iteration, respectively. In FIG. 2b, which is an illustration of iODT, (a) Propagation illustrates the propagation module and the tomographic imaging configuration. (x, y) are global coordinates; ($\xi$, $\eta$) are local coordinates; $\theta$ is the illumination angle; $u_0$ is the known incident wave; $u_t$ represents the true diffracted fields measured experimentally or through simulations of phantoms; $f^{(m)}$ represents the reconstructed object at the $m^{th}$ iteration; S is a propagation solver; (b) Inversion illustrates the Rytov-based inversion module. The forward and backward propagated fields produce perturbative complex phases, which are filtered in the frequency domain and summed in the spatial domain, to produce a perturbative correction to the object function.

This method improves the reconstruction quality by iteratively reducing the error between the fields that are diffracted by the reconstructed object, and the true fields that are measured experimentally or obtained through simulations of phantoms, for all illumination angles. The true field $u_t(\xi=d, \eta, \theta)$ is obtained by measuring the complex field in the plane of the CCD camera and backpropagating it to the $\xi=d$ plane through free space and any intervening optical elements (this may also be accomplished by forward propagating the field from the plane conjugate to the camera plane to the $\xi=d$ plane through background medium).

The iterative algorithm is based on successive improvements on estimates of the object function. If in the $m^{th}$ iteration is a known imperfect estimate of the true object function $f(x, y)$, and if the field generated by forward propagating the known incident field $u_0(\xi, \eta)$ through $f^{(m)}(x,y)$ at angle $\theta$ is $u^{(m)}_{fwd}(\xi, \eta, \theta)$, then the associated complex phase is $$\varphi_R^{(m)}(\xi, \eta, \theta) = \ln\frac{u^{(m)}_{fwd}(\xi, \eta, \theta)}{u_0(\xi, \eta)}.$$

The perturbative complex phase is then $$\Delta\varphi_R^{(m)}(\xi, \eta, \theta) = \ln\frac{u^{(m)}_{fwd}(\xi, \eta, \theta)}{u_0(\xi, \eta)} - \ln\frac{u_t(\xi, \eta, \theta)}{u_0(\xi, \eta)} = \ln\frac{u^{(m)}_{fwd}(\xi, \eta, \theta)}{u_t(\xi, \eta, \theta)}, \quad (4)$$

where $u_t(\xi, \eta, \theta)$ is the true, but unknown, field throughout the scattering area/volume. In conventional ODT, $u_t(\xi, \eta, \theta)$ is estimated by backpropagating the true field $u_t(\xi=d, \eta, \theta)$ through the background medium, but since we now have a known estimate $f^{(m)}(x,y)$ of the object, we heuristically use instead the measured field backpropagated through the estimated object, which we denote $u_{bwd}^{(m)}(\xi, \eta, \theta)$. It follows that $$\Delta\varphi_R^{(m)}(\xi, \eta, \theta) \approx \ln\frac{u^{(m)}_{fwd}(\xi, \eta, \theta)}{u^{(m)}_{bwd}(\xi, \eta, \theta)}. \quad (5)$$

If the estimated object $f^{(m)}(x,y)$ equals the true object $f(x,y)$, then $u^{(m)}_{fwd}(\xi, \eta, \theta) = u^{(m)}_{bwd}(\xi, \eta, \theta)$ for all angles, and the perturbation $\Delta\phi^{(m)}_R(\xi, \eta, \theta) = 0$. This is the perfect solution consistent with both input and output boundary conditions. Since this condition is not generally satisfied, we use this perturbation $\Delta\phi^{(m)}_R(\xi, \eta, \theta)$ to calculate the corresponding correction to the reconstructed object function, $\Delta f^{(m)}(x,y) = f^{(m)}(x,y) - f(x,y)$, by means of formulae derived from Eqs. (2) and (3):

$$\Delta\Pi_{EDOF}^{(m)}(\xi, k_\eta, \theta) = \Delta\varphi_R^{(m)}(\xi, k_\eta, \theta)|k_\eta|, \quad (6)$$

$$\Delta f^{(m)}(x, y) = -j2\pi k_b \int_0^{2\pi} \Delta\Pi_{EDOF}^{(m)}(\xi, \eta, \theta)d\theta. \quad (7)$$

We now use the correction $\Delta f^{(m)}(x,y)$ to determine a new estimate for the true object function, $f^{(m+1)}(x,y)=f^{(m)}(x,y)-\Delta f^{(m)}(x,y)$, where m=0, 1, . . . is the iteration number as illustrated in the block diagram in FIG. 2a. If the initial guess to $f^{(0)}(x,y)=0$, then the first iteration of the iODT generates a reconstructed object function $f^{(1)}(x,y)$ identical to that of conventional ODT. Prior information on the true object function $f^{(1)}(x,y)$ may be used to apply constraints, such as non-negativity or reality, or non-constraint on the estimated object function $f^{(m)}(x,y)$ at each iteration. The algorithm is then described by the iterative relation $$f^{(m+1)}(x,y) = \mathcal{C}[f^{(m)}(x,y) - \Delta f^{(m)}(x,y)], \quad (8)$$

where $\mathcal{C}$ is a constraint operator. To implement the iODT algorithm, it is necessary to solve the forward and backward propagation problems at each angle for each iteration. An accurate and efficient forward solver S is used to calculate the forward-propagated field $u_{fwd}^{(m)}(\xi,\eta,\theta)=S[u_0, f^{(m)}(x,y), \theta]$, which is generated by the incident wave $u_0$ as it propagates through the object $f^{(m)}(x,y)$ at each angle $\theta$. The same solver is used in the reverse direction $(S^{-1})$ to calculate the backward propagated field $u_{bwd}^{(m)}(\xi,\eta,\theta)=S^{-1}[u_t(d,\eta,\theta), f^{(m)}(x,y), \theta]$, which results from backpropagating the true field $u_t(d,\eta,\theta)$ through the estimated object at each angle $\theta$.

The disclosed iODT algorithm also advantageously operates using a proper convergence criterion. Furthermore, it is advantageous to institute a stopping criterion independent of the object. When the error between the estimated sinogram $u_{fwd}^{(m)}(d,\eta,\theta)$ and the true sinogram $u_t(d,\eta,\theta)$ converges, the correction to the object function will be negligible in comparison with the object function itself. To characterize the deviation between the estimated sinogram and the true sinogram in each iteration, we define the normalized-root-mean-square (nRMS) error between these two sinograms in both amplitude and phase $$\delta_A(m) = \frac{\sqrt{\sum[|u_t(\eta,\theta)|-|u_{fwd}^{(m)}(\eta,\theta)|]^2/N_{pix}}}{\text{range}[|u_t(\eta,\theta)|]}, \quad (9)$$

$$\delta_\phi(m) = \frac{\sqrt{\sum\{\mathcal{W}[\text{Arg } u_t(\eta,\theta) - \text{Arg } u_{fwd}^{(m)}(\eta,\theta)]\}^2/N_{pix}}}{\text{range}\{\mathcal{W}[\text{Arg } u_t(\eta,\theta)]\}}, \quad (10)$$

where $N_{pix}$ is the number of pixels in the sinogram, $\mathcal{W}$ is a phase-wrapping operator, Arg{·} returns the principal value of phase, and the argument $\xi=d$ is ignored for brevity. When convergence is achieved, the variation of the nRMS errors $\delta_A$ and $\delta_\phi$ will be vanishingly small for successive Q iterations. If these errors fail to converge before a predefined maximum number of iterations, the iterative reconstruction will be terminated at this predefined number. Therefore, we select the stop conditions as follows $$|\delta_A(m)-\delta_A(m-q)|<\delta_{tol},$$

$$|\delta_\phi(m)-\delta_\phi(m-q)|<\delta_{tol}, \quad (11)$$

or $m>m_{max}$
where $\delta_{tol}$ is predefined tolerance level, parameter q=1, 2, . . . Q, and $m_{max}$ is the predefined maximum number of iterations.

Exemplary Results

We have verified the effectiveness of the iODT algorithm for objects with high RI contrast, complex structures, and/or large OPDs by both simulations and experiments. In simulation verifications, the true sinograms are obtained from phantoms using the finite-difference time-domain (FDTD) method, which is considered the most accurate. In experimental verifications, the interferograms are measured using a Mach-Zehnder interferometer and the true sinograms are extracted from the interferograms. In the iterative reconstruction process, an accurate and efficient numerical solver is highly desirable in order to calculate the forward and backward fields in Eq. (5) for all illumination angles. Herein, we use the wide-angle beam propagation method (WABPM), instead of FDTD, which is also the most time-consuming, as the numerical solver for each iteration. The L2-norm method is used to unwrap the complex phase. To suppress high-frequency noise, the ramp filter in Eq. (6) can be replaced by a Shepp-Logan-Gaussian filter, which is a product of a Shepp-Logan filter and a Gaussian filter. For constraints, non-positivity or non-negativity will be applied to the real part of reconstructed RI distribution if it is a priori known that the background medium has, respectively, largest or smallest RI. For phase objects, a non-imaginary constraint will also be applied to the reconstructed object function. For the stop condition, the sinogram errors are compared for the successive Q=10 iterations and the error tolerance level $\delta_{tol}$ is chosen to be $10^{-3}$. The iODT algorithm is implemented in MATLAB 2016a and the simulation is conducted in a computer equipped with an Intel® Core™ i7-5820K 3.3 GHz CPU and a 32 GB RAM.

Validation Based on Simulated Data

True sinograms from phantoms with high contrast, complex structures, and/or large OPDs, consisting of diffracted fields corresponding to illumination angles from 0° to 355° with an increment of 5°, are calculated using the FDTD method. If the phantom or the reconstructed object in each iteration has rotational symmetry of order a, only the fields corresponding to the angles from 0° to 360°/α need to be calculated. The wavelength of the probe light $\lambda_0$ is 650 nm and the RI of the background medium $n_b$ is 1.4584 so that the wavelength in this medium $\lambda_b$ is 445.7 nm. For the following examples, we will use these wavelengths and background RI, unless otherwise specified.

Two-Core Fiber

Figure 3:
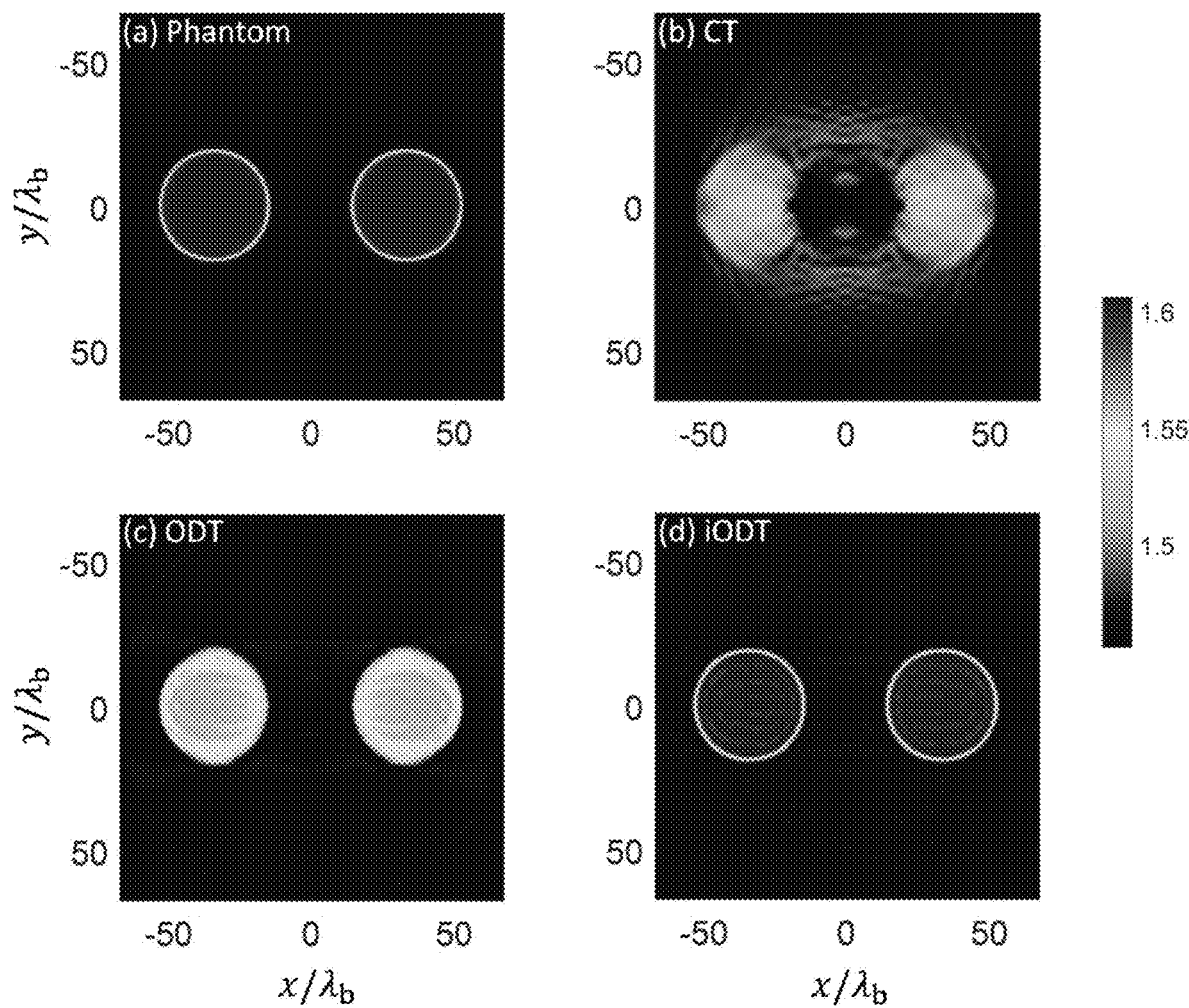
FIG. 3: (a) RI distribution of the phantom of a two-core fiber (10% contrast); Reconstructions using (b) CT, (c) ODT, and (d) iODT (m=21).
Figure 4:
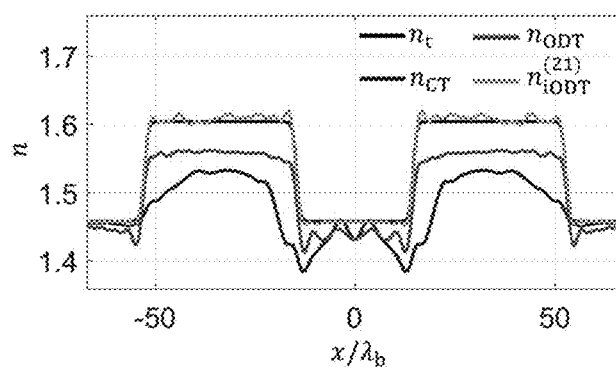
FIG. 4 graphically shows 1D cross sections of the phantom and reconstructions using CT, ODT, and iODT (m=21).

In this example, the phantom is a two-core fiber with core diameters of 20 μm separated by 30 μm, and a core-cladding/background RI contrast of 10%. This phantom is used to validate the effectiveness of iODT in reconstructing objects with high RI contrast and large OPD (11.1$\lambda_b$ in this case). The computational domain is sampled with grid size $\Delta x=\Delta y=\Delta_b/2$. The data processing time of iODT reconstruction is approximately 0.4 minutes per iteration. The RI distribution of the phantom and the reconstructed object using three different algorithms, CT, ODT and iODT (m=21), are shown in FIG. 3, and their horizontal cross sections are plotted in FIG. 4. In the CT reconstruction, there are many artifacts between the two cores as well as around the background because the phase unwrapping, applied on the sinogram, undergoes significant failures which contaminate the reconstruction. In the ODT reconstruction, EDOF-FBPP propagates the field in the background medium, thus it can model the defocused field to some extent. The modelling of the defocused field is more accurate for illumination angles at which the two cores are approximately aligned in the transverse direction so that the probe beam is diffracted by each core independently. The phase unwrapping, applied locally on the back-propagated fields, performs well for these angles. Therefore, the artifact in the reconstructed RI distribution in the transverse direction is suppressed. However, for the remaining illumination angles where the two cores are aligned approximately along the wave propagation direction, the defocused field cannot be accurately modeled by EDOF-FBPP because of multiple scattering. As a result, the phase differences against the background are still large and have phase vortices, causing phase-unwrapping failures, which introduce errors into the reconstructed RI. To consider the multiple-scattering effect in the iODT reconstruction, plane waves and true fields are forward and backward propagated, respectively, for each illumination angle, through an estimate of RI distribution instead of the background medium. The perturbative complex phase remains small and therefore can be successfully unwrapped. The RI distribution reconstructed by iODT (see FIG. 3) is the more accurate in terms of shape, RI values and artifact suppression, as quantified below.

Figure 5:
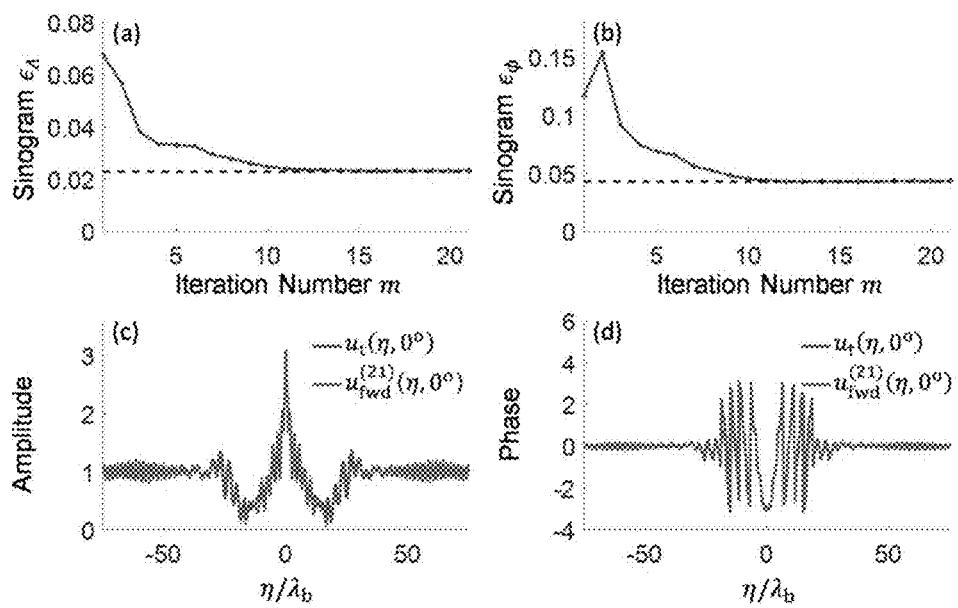
FIG. 5. The nRMS errors in the amplitude (a) and the phase (b) of the sinograms as functions of the iteration number m. The dashed lines in (a) and (b) indicate the floors corresponding to the discrepancy between WABPM and FDTD. The amplitude (c) and phase (d) of the field diffracted by the phantom (blue) and by the reconstructed object (red) after 21 iterations for the illumination angle of 0°.

The nRMS errors in the amplitude and phase of the sinograms as functions of the iteration number are shown in FIGS. 5(a) and (b), respectively. Since the $2\pi$ phase ambiguities are gradually removed by phase unwrapping in each iteration, the nRMS error in the phase of sinograms, which is defined by the wrapped phase difference [see Eq. (10)], may diverge temporarily, after which the iteration converges quickly. The iterative reconstruction converges by 21 iterations, at which the sinogram errors approach the floors corresponding to the discrepancy between WABPM and FDTD (indicated by the dashed lines), which indicates that the object can be accurately reconstructed using the iODT method. After 21 iterations, the amplitude and phase of the field diffracted by the phantom and by the reconstructed object for the illumination angle of 0° are displayed in FIGS. 5(c) and (d), respectively.

In order to assess upper limits on the contrast of objects that may be successfully reconstructed using iODT, we have tested the two-core fiber phantoms at various contrast levels (higher than the 10% example shown above). We find that the maximum RI contrast that iODT can adequately reconstruct is about 12% ($\Delta n$=0.1750). If the contrast is 14%, then the value of the reconstructed RI is about 0.023 smaller than that of the phantom. However, the fields diffracted by the phantom and the reconstructed object match well, indicating that iODT reconstruction is trapped in a local minimum.

19-Core Fiber

Figure 6:
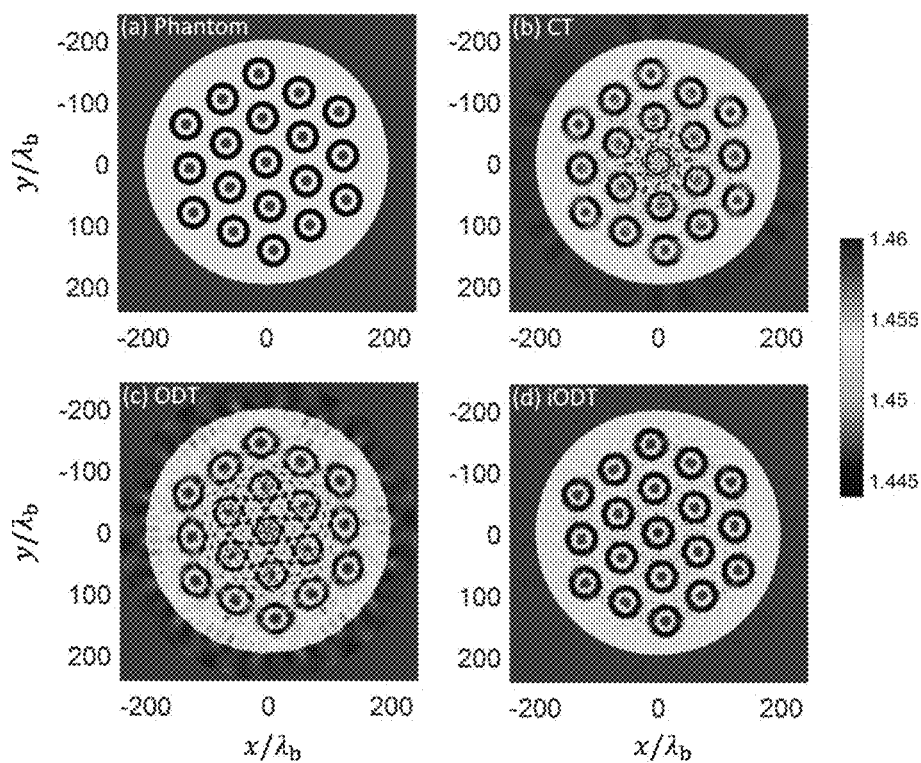
FIG. 6. (a) RI distribution of a 19-core fiber phantom. Reconstructions using (b) CT, (c) ODT, and (d) iODT (m=34).

In this test, we create a phantom with a complex structure and large OPD ($2.5\lambda_b$) to demonstrate the effectiveness of iODT against multiple scattering. The phantom is a 19-core fiber with a cladding RI of 1.453 and cladding diameter of 180 µm. Each core has a RI of 1.458 and diameter of 9.2 µm surrounded by a trench with a width of 4.6 µm and RI of 1.444. The core-to-core distance is 32 µm. The largest RI variation $\Delta n$=0.014 is between the trench and the core, so that the RI contrast is about 0.96%. The grid size used in the reconstruction is $\Delta x = \Delta y = \lambda_b/2$. The data processing time of iODT reconstruction is about 1.6 minutes per iteration. The RI distributions of the phantom and the reconstructed object using the CT, ODT, and iODT (m=34), are shown in FIG. 6. In the CT reconstruction, the phase-unwrapping failures, attributed to the presence of phase vortices, introduce severe artifacts around the central region of the reconstruction. EDOF-FBPP, propagating the true field through the background medium, however, fails to model the defocused fields correctly because the multiple-scattering effect caused by this multi-core fiber is not negligible for all illumination angles. Ironically, the phase differences against the background field remain large and contain complex distributions, caused by phase vortices, which exacerbate the phase-unwrapping failures. Consequently, the ODT reconstruction contains more artifacts. Compared with CT and ODT, the reconstruction using iODT is more accurate in terms of RI distribution and artifact suppression.

Figure 7:
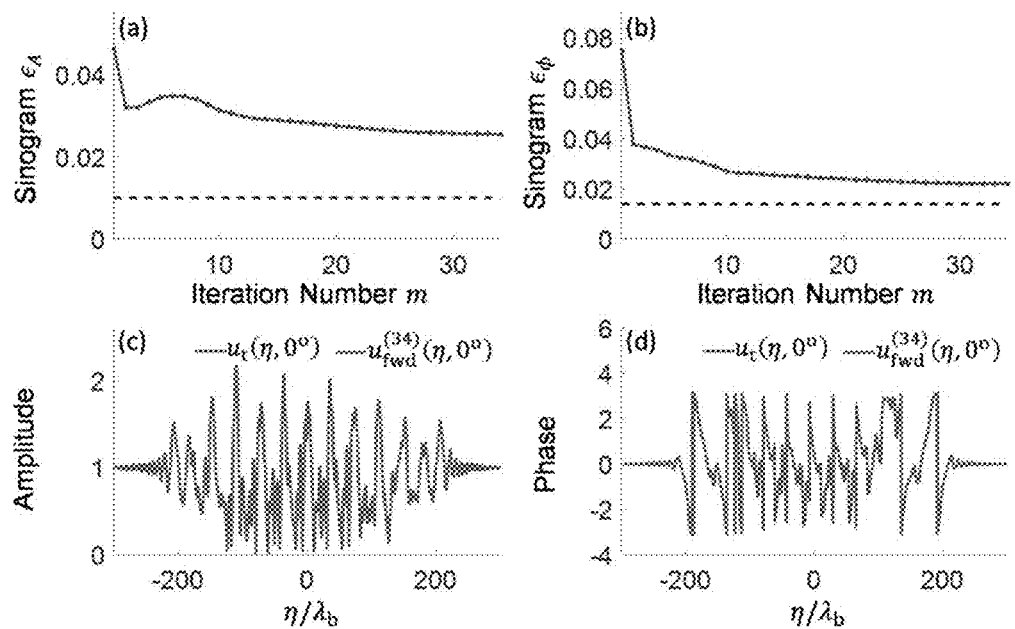
FIG. 7. The nRMS errors in the amplitude (a) and the phase (b) of the sinograms as functions of the iteration number m. The dashed lines in (a) and (b) indicate the floors corresponding to the discrepancy between WABPM and FDTD. The amplitude (c) and phase (d) of the field diffracted by the phantom (blue) and by the reconstructed object (red) after 34 iterations for the illumination angle of 0°.

The nRMS errors in the amplitude and phase of the sinograms as functions of the iteration number are shown in FIGS. 7(a) and (b), respectively. The sinogram errors converge by 34 iterations, reducing the nRMS error in amplitude from 4.7% to 2.5% and the error in phase from 7.3% to 2.2%, respectively. The nRMS errors do not reach the floors corresponding to the discrepancy between WABPM and FDTD (indicated by the dashed lines). After 34 iterations, the amplitude and phase of the field diffracted by the phantom and by the reconstructed object for the illumination angle of 0°, are shown in FIGS. 7(c) and (d), respectively. We believe the reason why the nRMS errors do not reach the WABPM-FDTD floors is not due to the iODT method itself. We have verified that by increasing the angular resolution of the sinogram from 5° to 1°, the nRMS errors do reach the WABPM-FDTD floors. This is reasonable because the reduced periodicity between cores, from 180° in the previous case of the two-core fiber to 60° for the current 19-core fiber, necessitates a finer angular step size.

Shepp-Logan Phantom

Figure 8:
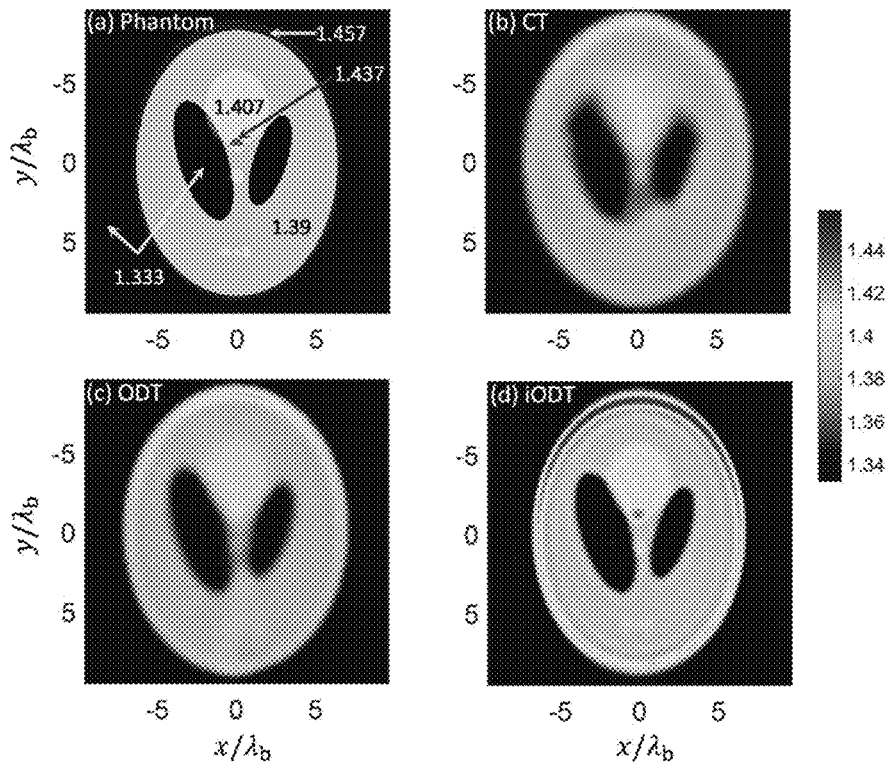
FIG. 8. (a) RI distribution of the Shepp-Logan phantom. Reconstructions using (b) CT, (c) ODT, and (d) iODT (m=14).
Figure 9:
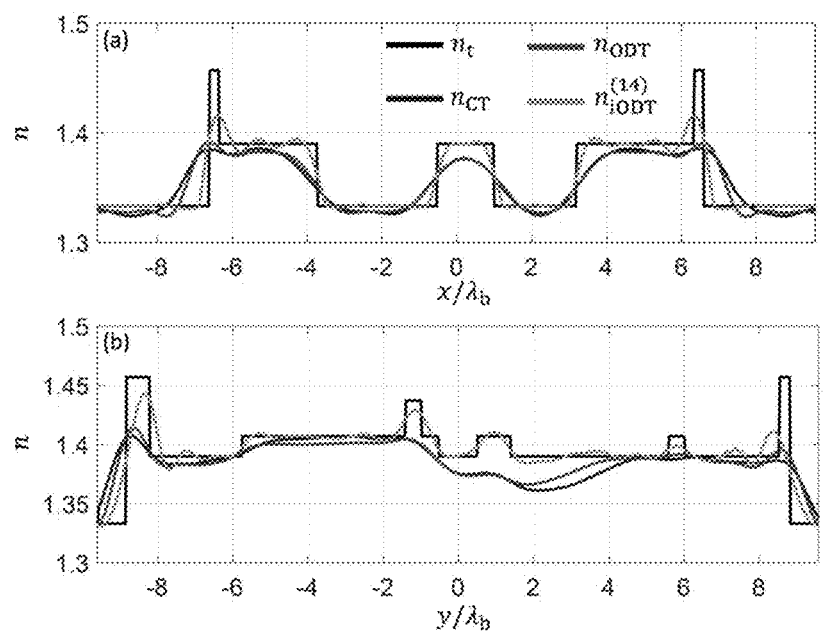
FIG. 9. Horizontal (a) and vertical (b) cross sections of the phantom and reconstructions using CT, ODT and iODT (m=14).

In this example, the capability of iODT will be further demonstrated by reconstructing the well-known Shepp-Logan phantom whose parameters are labeled in FIG. 8(a). The wavelength used in this test is 406 nm and the background RI is 1.333, so that the wavelength in the background medium $\lambda_b$ is 304.6 nm. The largest RI variation $\Delta n$=0.124 is between the phantom edge and the background, therefore the RI contrast is about 9.3%. To accurately represent the small features of this phantom, a small grid size $\Delta x = \Delta y = \lambda_b/35$ is used. The data processing time of iODT reconstruction is about 3 minutes per iteration. The RI distributions of the phantom and the reconstructed object using the CT, ODT, and iODT (m=14), are shown in FIG. 8, and their horizontal and vertical cross sections are displayed in FIGS. 9(a) and (b), respectively.

Because this phantom has feature sizes smaller than or comparable to the wavelength in the background medium and a RI contrast as high as 9.3%, the multiple-scattering effect cannot be neglected. As a result, small features in this phantom can only be resolved by iODT. In this reconstruction, a Shepp-Logan filter is employed to balance spatial resolution and artifact suppression. The three features at the bottom of the phantom are only visible in the iODT reconstruction. Since ODT and iODT have resolution of $\lambda_b/\sqrt{2}$ in the transmission configuration, the three features at the bottom of the phantom, which are smaller than $\lambda_b/2$, cannot be completely resolved, even with iODT.

Figure 10:
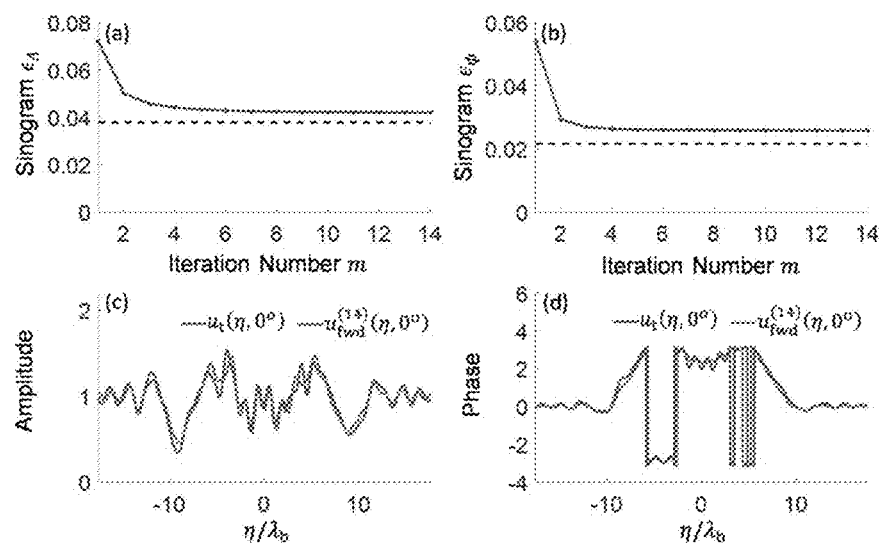
FIG. 10. The nRMS errors in the amplitude (a) and the phase (b) of the sinograms as functions of the iteration number m. The dashed lines in (a) and (b) indicate the floors corresponding to the discrepancy between WABPM and FDTD. The amplitude (c) and phase (d) of the field diffracted by the phantom (blue) and by the reconstructed object (red) after 14 iterations for the illumination angle of 0°.

The nRMS errors of the sinograms are presented in FIGS. 10(a) and (b). The error in the amplitude of the sinogram decreases from 7.2% to 4.2% and the error in the phase decreases from 5.4% to 2.5%. Sinogram errors converge by 14 iterations and approximately approach the floors corresponding to the discrepancy between WABPM and FDTD (indicated by the dashed lines). The amplitude and phase of the field diffracted by the phantom and the reconstructed object for the illumination angle of 0° are shown in FIGS. 10(c) and (d), respectively.

Experimental Validation

To evaluate the proposed iODT algorithm using experimental data, a commercial optical fiber profiler IFA-100 was used to collect the data. The setup was based on off-axis Mach-Zehnder phase-shifting interferometry in an object-rotating configuration. Light coming from an incandescent lamp, passing through a narrow-band filter and polarizer, is split into a reference beam and an object beam, both of which are rendered to be plane waves after the condensers. The sample to be imaged was held transverse to the illumination and controlled by a rotation motor. The interference between the object and reference arms are captured through an imaging system consisting of high-NA, oil-immersion objectives (25x, NA=1.4) and a tube lens by a CCD camera to create a digital hologram. The complex fields are extracted from the measured interferograms by the Fourier transform method or the Hilbert transform method. The true fields are obtained by forward propagating the field from the plane conjugate to the camera plane to the $\xi=d$ plane through the background medium. The data acquisition time is about one minute for each illumination angle.

19-Core Single-Mode Fiber

In this experiment, we choose a 19-core single-mode fiber, modeled earlier by the phantom, designed for spatial-division multiplexing as a test sample. The central wavelength of the narrow-band filter used in the experiment is 650 nm, at which the RI of the matching oil is 1.4584. Since the sample to be imaged, unlike the phantom shown in the previous examples, does not have rotational symmetry, interferograms corresponding to illumination angles extending from 0° to 355°, with an increment of 5°, are recorded using the profiler.

Figure 11:
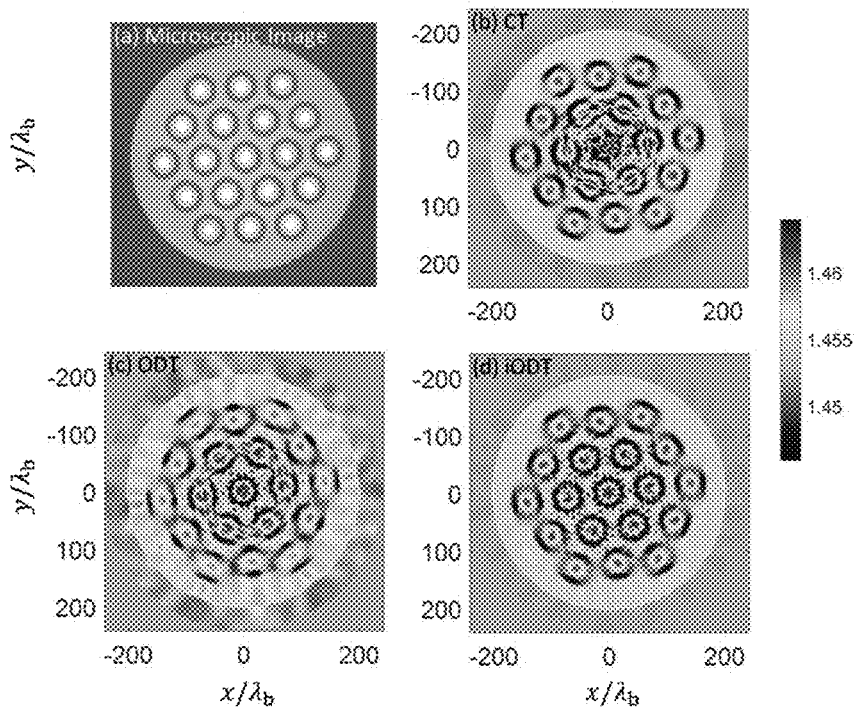
FIG. 11. (a) Microscopic image of the 19-core single-mode fiber. Reconstructions using (b) CT, (c) ODT, and (d) iODT (m=13).

The grid size in the reconstruction is $\Delta x=\Delta y=4.6/25=0.184$ μm, which equals the pixel size of the CCD camera divided by the magnification of the objective. The data processing time of iODT reconstruction is 10.2 minutes per iteration. The true sample, unlike the phantom of 19-core fiber shown in the previous case, does not have rotational symmetry of order 6, so that the reconstruction processing time is approximately scaled by a factor of 6. The microscopic image of the sample and the reconstructed RI distributions, using CT, ODT, and iODT (m=13) algorithms are shown in FIG. 11. In the CT reconstruction, the inability of modelling the defocused field accentuates the phase-unwrapping failures, resulting in large errors in the middle of the reconstruction. ODT, even when combined with extended depth of focus, also fails to model the defocused field correctly for all illumination angles, due to the fields only being backpropagated through the background medium. The phase differences against the background are not only large but complicated in their distributions, due to phase vortices. Therefore, more drastic failures in phase unwrapping are introduced, which results in reconstruction artifacts. The smearing effect in the iODT reconstruction may be related to the uncertainty of the rotation angles in the experiment, due to the fiber not rotating as a rigid object, with respect to the rotational mount.

Figure 12:
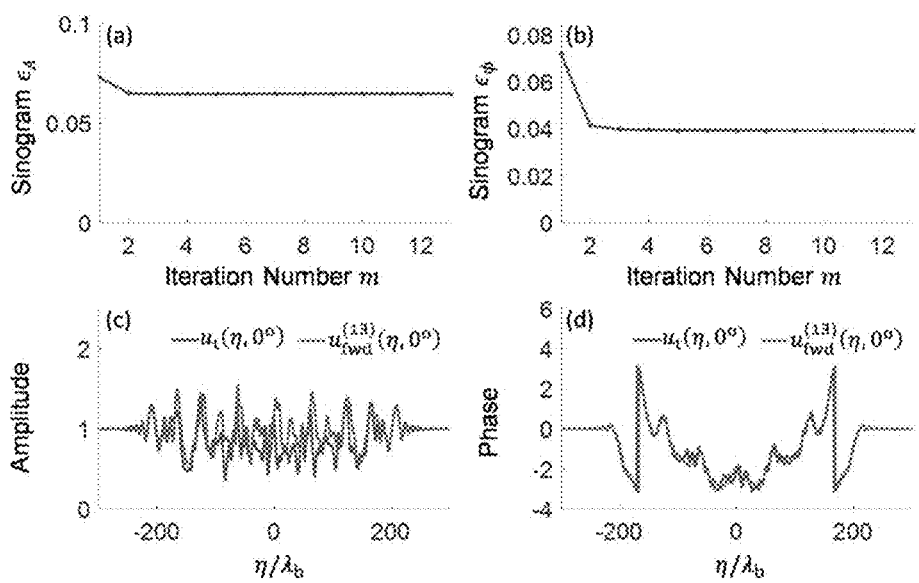
FIG. 12. The nRMS errors in the amplitude (a) and the phase (b) of the sinograms as functions of the iteration number m. The amplitude (c) and phase (d) of the experimental field (blue) and the simulated field diffracted by the reconstructed object (red) after 13 iterations for the illumination angle of 0°.

The dependence of the nRMS errors in the amplitude and phase of the sinograms versus the iteration number are presented in FIGS. 12(a) and (b), respectively. The sinogram errors decrease from 7.0% to 6.0% in the amplitude, and from 7.5% to 3.9% in the phase. Sinogram errors converge by 13 iterations. The amplitude and phase of the experimental field and the simulated field, which is diffracted by the reconstructed object, for the illumination angle of 0° are shown in FIGS. 12(c) and (d), respectively.

Leakage Channel Fiber

Figure 13:
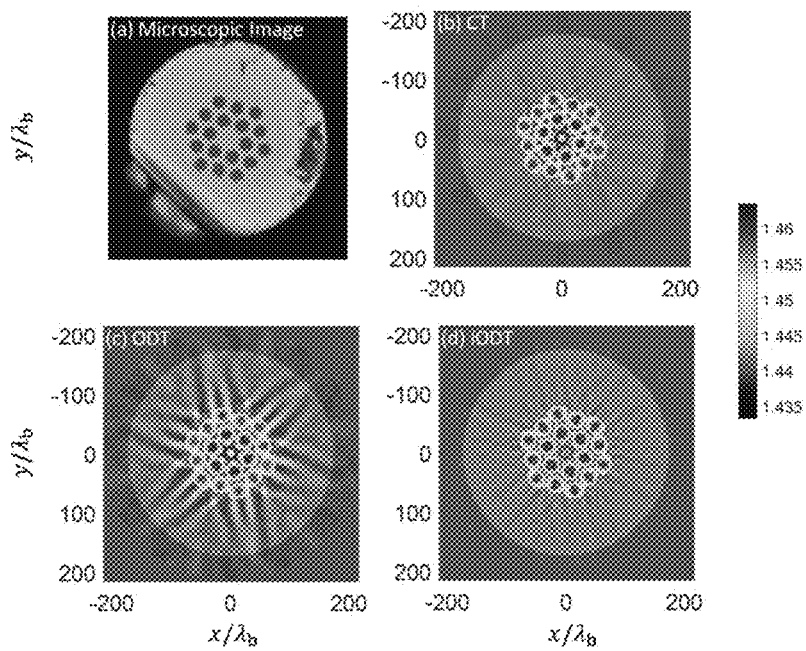
FIG. 13. (a) Microscopic image of the leakage channel fiber. Reconstructions using (b) CT, (c) ODT, and (d) iODT (m=12).

To further verify the effectiveness of iODT for the RI profiling of optical fibers, we provide another example of reconstructing the resonantly enhanced leakage channel fiber, whose cladding is tapered down to 16 μm. The two rings of fluorine-doped silica rods have lower refractive indices than that of the cladding silica. The middle core is also made of silica. The grid size used in the reconstruction is $\Delta x=\Delta y=4.6/25=0.184$ μm. The data processing time of iODT reconstruction is about 8 minutes per iteration. The microscopic image of this fiber and the reconstructed RI profiles using CT, ODT, and iODT (m=12) are demonstrated in FIG. 13. The artifacts, shown in the central and cladding region in the CT and ODT reconstructions, respectively, are suppressed in the iODT reconstruction.

Figure 14:
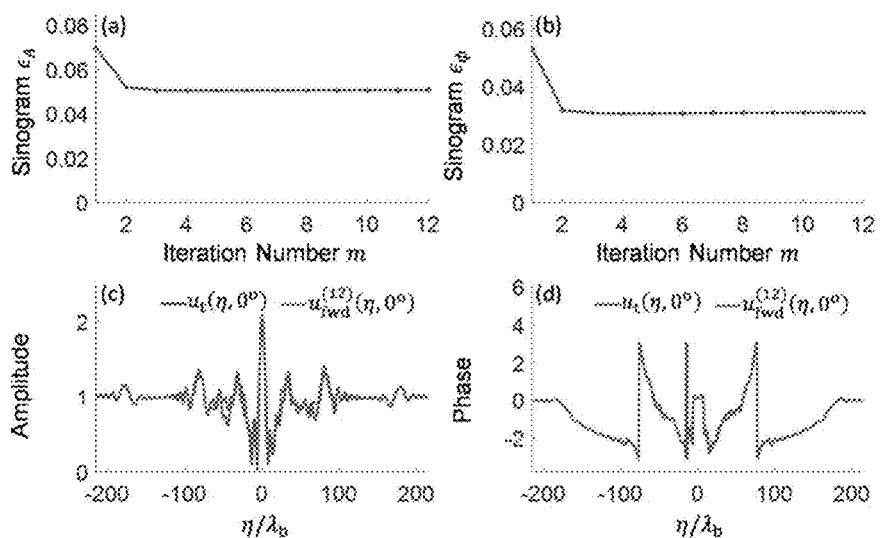
FIG. 14. The nRMS errors in the amplitude (a) and the phase (b) of the sinograms as functions of the iteration number m. The amplitude (c) and phase (d) of the experimental field (blue) and the simulated field diffracted by the reconstructed object (red) after 12 iterations for the illumination angle of 0°.

The nRMS errors of the sinograms are presented in FIGS. 14(a) and (b). The sinogram error decreases from 7.0% to 5.1% in the amplitude, and from 5.3% to 3.1% in the phase. Sinogram errors converge by 12 iterations. The experimental field and the simulated field, which is diffracted by the reconstructed object, for the illumination angle of 0° are shown in FIGS. 14(c) and (d).

Conventional optical diffraction tomography (ODT) relies on the Rytov approximation, which is a first-order perturbation/linearization method valid for weak-scattering objects satisfying certain smoothness conditions on the refractive index distribution and limits on the optical path differences. When these conditions are not met, the approximation no longer holds and the reconstruction fails. The inversion problem is also compounded by the emergence of many phase vortices in the fields diffracted by these objects. The embodied iterative optical diffraction tomography (iODT) algorithm demonstrates that it is applicable in such cases.

The first iteration of iODT provides an estimate of the unknown RI profile using the standard linearized ODT inversion algorithm. Subsequent iterations improve on this estimate by applying a perturbative correction based on differences between the fields diffracted by the imperfectly reconstructed object and the measured fields diffracted by the true object. This error is translated into an error in the associated complex phase, from which a correction to the reconstructed object function is computed. The Rytov approximation is used in every iteration as it is more applicable to the perturbative function, as opposed to the original function. Since the magnitude (distribution) of the perturbative function becomes smaller (smoother) at higher iterations, the Rytov approximation improves. Further, as expected, the number of phase vortices in the perturbative complex phase is gradually reduced in a self-healing process as the iterations converge. In essence, the embodied iterative algorithm is a nonlinear reconstruction based on perturbative expansion, much like a higher-order Born or Rytov expansion for forward propagation.

Through numerical simulations and experimental tests applied to various optical fiber RI profiles, we have verified that this heuristic iterative algorithm provides both better accuracy and fast convergence, as well as sub-wavelength resolution. One added benefit is that the method tends to suppress errors resulting from phase-unwrapping failures, which typically occur in such field-based inverse problems. We therefore maintain that iODT offers a reliable alternative to conventional ODT for reconstructing fiber RI profiles of higher contrast, complex structures, and/or large optical path differences. For objects with contrast exceeding 12% and/or complex configurations, iODT is prone to failure primarily caused by the proliferation of phase vortices of the perturbative complex phase and phase-unwrapping errors, which result in the creation of artifacts in the reconstruction, trapping in a local minimum, or even divergence of the iterative process.

While various disclosed embodiments have been described above, it should be understood that they have been presented by way of example only and not as a limitation. Numerous changes to the disclosed embodiments can be made in accordance with the specification herein without departing from the spirit or scope of this specification. Thus the breadth and scope of this specification should not be limited by any of the above-described embodiments; rather, the scope of this specification should be defined in accordance with the appended claims and their equivalents.

We claim:

1. A method for performing iterative Optical Diffraction Tomography (iODT) to reconstruct an object, comprising the ordered steps of:
   a) providing an object to be optically reconstructed, wherein said object is a multiply-scattering two-dimensional or three-dimensional phase object exhibiting a high refractive index contrast, a complex structure, or a large optical path difference against a background;
   b) selecting initial parameter values $\theta$: illumination angle, $u_0$: known incident wave, $u_t$: true diffracted field;
   c) selecting a constraint operator, C, and a propagation solver, S;
   d) applying the constraint operator, C, to the current estimated object function, as $Cf^{(m)}$;
   e) applying the propagation solver, S, to the known incident wave, $u_0$, through $Cf^{(m)}$ for each illumination angle, $\theta$, to generate a first forward propagating field, $u^{(m)}_{fwd}(\theta)$;
   f) applying an inverse of the propagation solver, $S^{-1}$, to the true diffracted field, $u_t$, through $Cf^{(m)}$ for each illumination angle, $\theta$, to generate a first backward propagating field, $u^{(m)}_{bwd}(\theta)$;
   g) computing the perturbative Rytov phase $\Delta\varphi^{(m)}_R(\theta)$ as $\ln[u^{(m)}_{fwd}(\theta)/u^{(m)}_{bwd}(\theta)]$;
   h) computing a correction, $\Delta f^{(m)}$, to the current estimate of the object function using the perturbative Rytov phase;
   i) updating the estimate of the object function to $f^{(m)} - \Delta f^{(m)}$
   j) increasing the iteration number from m to m+1;
   k) repeating steps (c-i) until a selected stop condition is met or a predetermined maximum number of iterations is reached; and
   l) obtaining an image or optical reconstruction of the object.

2. The method of claim 1, wherein the constraint operator, C, is unity (i.e., a non-constraint), non-negativity, non-positivity, or reality (i.e., non-imaginary).

3. The method of claim 1, wherein the propagation solver, S, is the wide-angle beam propagation method (WABPM) or finite difference time domain (FDTD).

4. The method of claim 1, wherein computing the correction $\Delta f^{(m)}$ involves the following steps:
   a) obtaining a $\Pi$-image in the Fourier domain, $\Delta\Pi^{(m)}(\theta)$, by applying a filter to the Fourier transform of the perturbative Rytov phase $\Delta\varphi^{(m)}_R(\theta)$;
   b) obtaining the correction, $\Delta f^{(m)}$ by summing the inverse Fourier transform of the $\Pi$-images over all illumination angles, $\theta$.

5. The method of claim 4, wherein the filter is a ramp filter or a Shepp-Logan-Gaussian filter.

6. The method of claim 1, wherein the known incident wave, $u_0$, is a plane wave.

7. A method for performing iterative Optical Diffraction Tomography (iODT) for the reconstruction of a refractive index (RI) profile of a multiply-scattering object, comprising: providing an object to be imaged or optically reconstructed, wherein said object is a multiple-scattering two-dimensional or three-dimensional phase object exhibiting a high refractive index contrast, a complex structure, or a large optical path difference against a background;
   iteratively minimizing an error between an optical field diffracted by a a reconstructed object and an optical field;
   computing a perturbative correction to the RI profile based on the error calculated from a previous estimate of the RI profile;
   forming a new estimate for a next iteration;
   computing a new perturbative correction to the RI profile based on the error calculated from the previous estimate of the RI profile; and
   stopping the process when a convergence criterion is met and a reconstructed object image is formed or a stopping criterion is met and no reconstructed object image is formed.

* * * * *